United States Patent

Metton et al.

[11] Patent Number: 6,109,791
[45] Date of Patent: Aug. 29, 2000

[54] ROLLING BEARING WITH NOISE REDUCTION

[75] Inventors: Norbert Metton; Wolfgang Steinberger, both of Herzogenaurach, Germany

[73] Assignee: Ina Walzlager Schaeffler oHG, Germany

[21] Appl. No.: 09/308,010

[22] PCT Filed: Apr. 24, 1997

[86] PCT No.: PCT/EP97/02087

§ 371 Date: May 11, 1999

§ 102(e) Date: May 11, 1999

[87] PCT Pub. No.: WO98/22725

PCT Pub. Date: May 28, 1998

[30] Foreign Application Priority Data

Nov. 20, 1996 [DE] Germany ............... 196 48 036
Dec. 14, 1996 [DE] Germany ............... 196 52 178

[51] Int. Cl.[7] ....................................... F16C 33/58
[52] U.S. Cl. ............................ 384/99; 384/569; 384/581
[58] Field of Search .................... 384/99, 569, 581, 384/477, 570

[56] References Cited

U.S. PATENT DOCUMENTS

| | | |
|---|---|---|
| 3,829,181 | 8/1974 | Gunther et al. . |
| 4,337,983 | 7/1982 | Hibner . |
| 4,440,456 | 4/1984 | Klusman . |
| 5,352,100 | 10/1994 | Bauknecht et al. . |
| 5,419,641 | 5/1995 | Fujinami et al. . |
| 5,421,657 | 6/1995 | Arff et al. . |

FOREIGN PATENT DOCUMENTS

| | | |
|---|---|---|
| 1507257 | 11/1966 | France . |
| 0412870 | 2/1991 | France . |
| 1978056 | 2/1968 | Germany . |
| 39 11 670 | 10/1990 | Germany . |
| 4134604 | 4/1993 | Germany . |
| 4204981 | 8/1993 | Germany . |
| 42 2 7 66 | 2/1994 | Germany . |
| 43 32 032 | 3/1995 | Germany . |
| 44 41 237 | 7/1995 | Germany . |
| 4440313 | 8/1995 | Germany . |
| 195 1 3 668 | 10/1996 | Germany . |
| WO9322575 | 11/1993 | WIPO . |

*Primary Examiner*—Lenard A. Footland
*Attorney, Agent, or Firm*—Bierman, Muserlian and Lucas

[57] ABSTRACT

A rolling bearing (5) which is used for the clearance-free and noiseless mounting of a shaft (2) of a converter in an automatic transmission comprises at least one race ring which is composed of two ring elements (11, 12) which define a gap (14) filled with fluid between themselves.

According to the invention, the first ring element (11) is configured as a thin-walled bushing whose raceway (10) comprises, in at least one peripheral section, an elastically yielding raceway convexity (13) deviating from its circular shape so that at least one of the rolling elements (6) is pre-stressed between the raceway convexity (13) and a raceway (9) situated opposite thereto.

4 Claims, 2 Drawing Sheets

ROLLING BEARING WITH NOISE REDUCTION

FIELD OF THE INVENTION

The invention concerns a rolling bearing having at least one race ring which is configured as a composite hollow ring comprising a first ring element in contact with rolling elements and a second ring element surrounding the first ring element, a gap filled with fluid being arranged between both ring elements.

BACKGROUND OF THE INVENTION

A silenced bearing of the pre-cited type is known from DE 41 34 604 A1. This bearing has a race ring configured as a hollow ring which consists of an outer ring element and an inner ring element with an oil-filled gap arranged between the two ring elements. In this way, the hollow ring is interrupted by a film of fluid so that the raceway noises caused on the raceway by the rolling elements are damped by the fluid film.

It is true that a damping of noise is accomplished in such a bearing but the reason for the noise, i.e. the occurrence of vibrations in the bearing due to self-movements of the mounted element is not eliminated.

SUMMARY OF THE INVENTION

The object of the invention is therefore to create a silenced bearing which, as far as possible, completely excludes the sources of noise while, at the same time, avoiding the drawbacks of the prior art.

The invention achieves this object according to the characterizing part by the fact that the first ring element is configured as a thin-walled bushing of uniform wall thickness whose raceway comprises, in at least one peripheral section, an elastically yielding raceway convexity deviating from its circular shape so that at least one of the rolling elements is radially pre-stressed between the raceway convexity and a raceway situated opposite thereto.

Due to this non-circular shape, a defined pre-stress can be applied to the shaft so that this is rendered free of play and has only a slight possibility of self-movement with the result that annoying noises are not even produced in the first place. The elastic properties of the raceway convexity must be chosen so that, on the one hand, a sufficiently high pre-stress is obtained on the shaft while, on the other hand, a slight self-movement of the shaft in radially outward direction is possible by a neutralization of the elasticity of the raceway convexities. An additional damping of the bearing by the oil-filled gap between the first and the second ring element of the hollow ring is produced when the elastic raceway convexities are pressed radially outwards by the mounted shaft.

The level of the pre-stress applied to the shaft is determined by the material used for making the thin-walled bushing and by its wall thickness. The larger the wall thickness of the material used, the higher the level of the pre-stress on the shaft. The elasticity of the normally used steel materials is also influenced by their hardness, i.e. the pre-stress on the shaft is higher in the case of a hardened steel than in the case of an unhardened steel.

The adjusted level of elasticity also depends on the number of points of the periphery at which the thin-walled bushing comprises raceway convexities deviating form the circular shape. Advantageously, therefore, the raceway of the bushing comprises a raceway convexity in three peripheral sections offset at 120° to each other. This results in a uniform pre-stress on the shaft from all sides, i.e. a self-movement is only possible by a neutralization of the elasticity of the thin-walled bushing existing in the regions of the raceway convexities.

According to a further feature of the invention, a flange of the second ring element comprises circumferentially uniformly spaced axial feed bores. The gap defined between the two ring elements is filled with damping fluid, i.e. with oil, through these feed bores.

A sealing ring is arranged on the end of the hollow ring remote from the feed bores between the flange of the second ring element and the rolling element crown ring.

This sealing ring assures a uniform oil pressure and a defined leakage because it prevents an uncontrolled outflow of the oil which is fed into the bearing for filling the gaps. Since this sealing ring is seated on the shaft, i.e. not firmly connected thereto, its speed of rotation will be $\leq$ the speed of rotation of the shaft.

Finally, a bearing according to the invention is used for the clearance-free mounting of a converter neck of a hydrodynamic torque converter, preferably for an automatic transmission. In this way, advantageously, noises occurring in the region of the converter and the oil pump which are transmitted through the bearing to the housing of the transmission can be effectively prevented.

The same advantageous effects are also achieved by the fact that the first ring element is configured as a thin-walled bushing of uniform wall thickness whose raceway comprises, in at least one peripheral section, an elastically yielding raceway convexity deviating from its circular shape so that a gap is formed between the first and the second ring element in this peripheral section, and at least one of the rolling elements is radially pre-stressed between the raceway convexity and a raceway situated opposite thereto. The main difference with regard to the solution is that the gap or gaps formed between the two ring elements are not filled with a fluid.

The invention will now be described more closely with reference to the following example of embodiment.

DETAILED DESCRIPTION OF THE DRAWINGS

Figure 1:
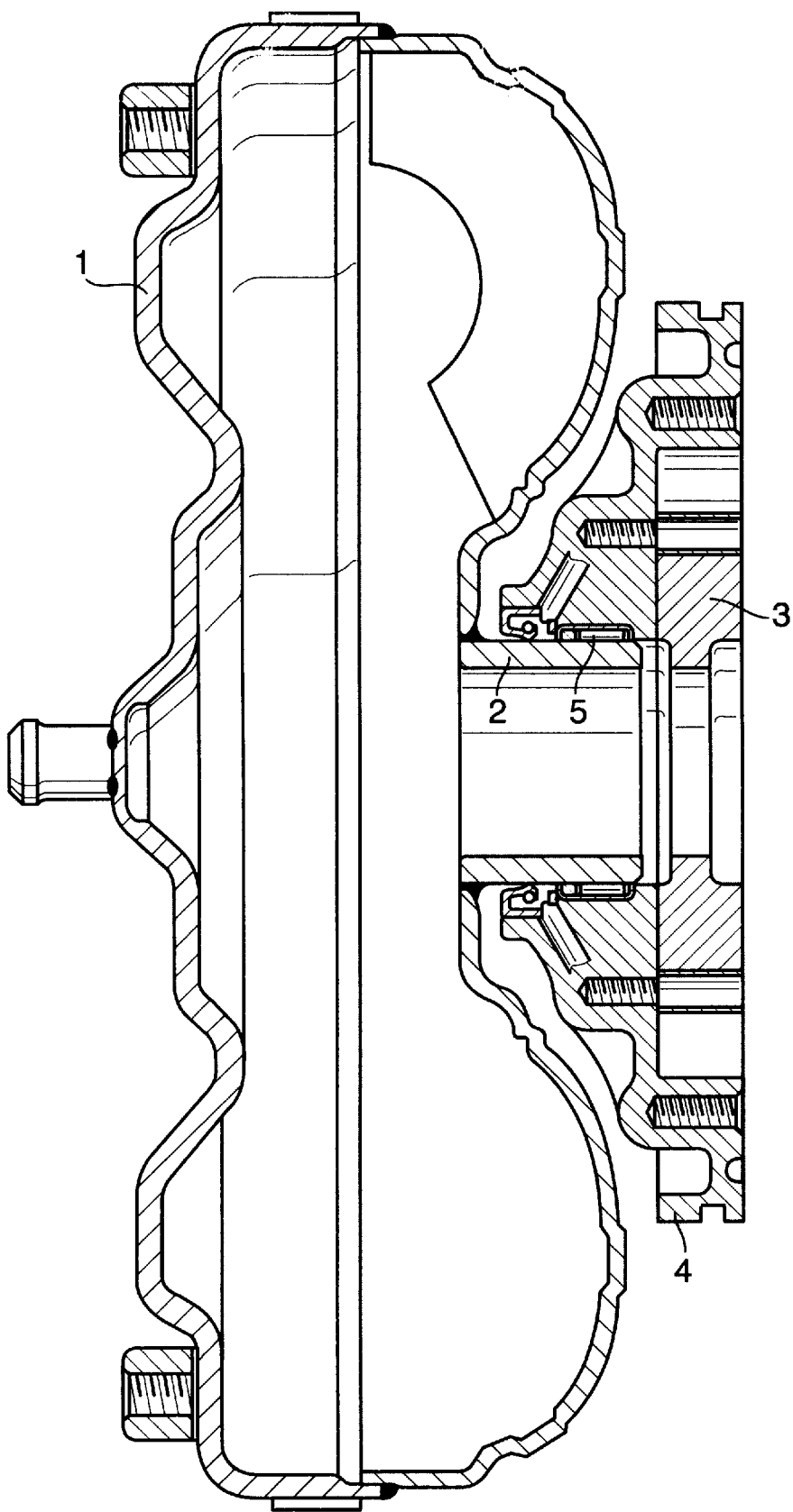
FIG. 1 is a longitudinal section through a partially represented converter of an automatic transmission.

The hydrodynamic torque converter partially represented in FIG. 1 converts the mechanical energy of the engine into flow energy via the input rotor 1 which is driven directly by the engine. The further components, output rotor, stator, over-running clutch and input shaft of the transmission which normally form a part of such a drive are not shown in this simplified representation. Every converter also comprises an oil pump for maintaining the control pressure for the actuation of the transmission. This oil pump is comprised of the pump wheel 3 which is lodged in the pump housing 4 and firmly connected to the shaft 2 of the converter. The shaft 2 of the converter is mounted in this pump housing 4 for rotation through the rolling bearing 5. To prevent noises which occur in the region of the converter and the oil pump and which are transmitted to the entire housing through the bearing 5, this bearing 5 should be configured in accordance to the invention as can be seen in FIGS. 2 and 3 and from the following description.

Figure 2:
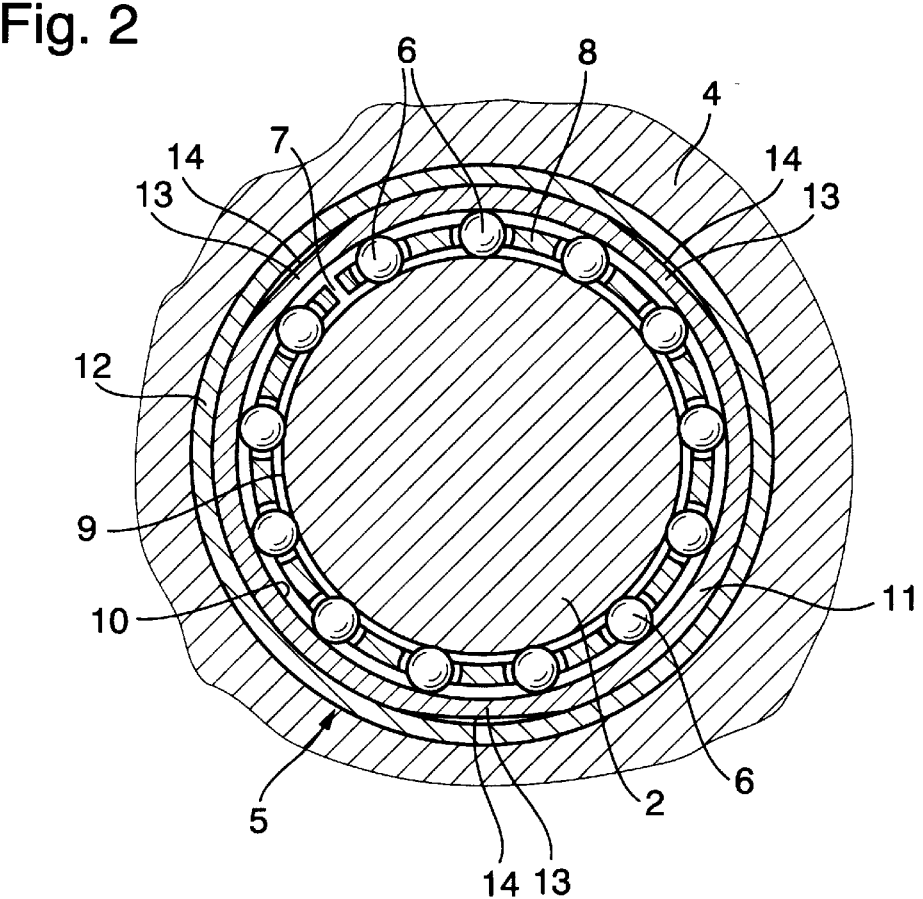
FIGS. 2 and 3 are a cross-section and a longitudinal section respectively, through a bearing according to the invention.

According to FIG. 2, the shaft 2 is mounted in the bearing 5 whose rolling elements are configured as bearing needles 6 which are guided in axially parallel relationship by a cage 8 having a slit 7. The bearing needles 6 are in rolling contact with raceways 9 and 10 formed respectively by the outer peripheral surface of the shaft 2 and by a first ring element 11 which is configured as a thin-walled bushing. This first ring element 11 or bushing is surrounded by a second ring element 12 which is lodged in the housing 4. In three peripheral sections offset to each other at 120°, the bushing 11 comprises a raceway convexity 13 deviating from the circular shape so that gaps 14 are formed between the bushing 11 and the second ring element 12. The raceway convexities 13 are elastically yielding in radial direction so that, on the one hand, the shaft 2 of the converter is firmly pre-stressed in three circumferential regions because the bearing needles 6 bear both against the inner raceway 9 and the outer raceway 10. On the other hand, a self-movement of the shaft 2 in radially outward direction is possible when the elasticity originating from the raceway convexities 13 has been overcome. This possible self-movement of the shaft 2 is additionally damped by the oil-filled gaps 14 so that noises are effectively forestalled.

Figure 3:
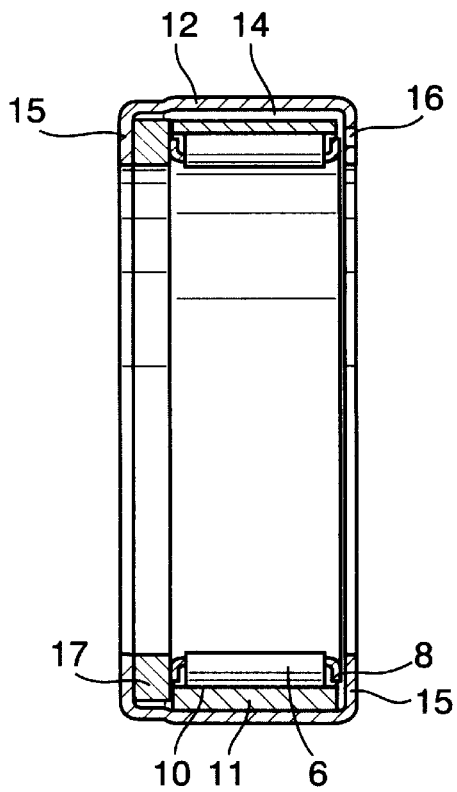

As can be seen in FIG. 3, the hollow ring composed of the two ring elements 11, 12 comprises a radially inwards directed flange 15 at each of its two ends. The flange 15 on one end comprises a plurality of circumferentially uniformly spaced feed bores 16 which serve to supply oil to the gaps 14. At the end opposite the feed bores 16, a sealing ring 17 is arranged between the rolling element crown ring 6 and the flange 15 of the second ring element 12 and is seated on the shaft 2 of the converter. This sealing ring 17 defines a leak gap with each of the shaft 2 and the flange 15 so that an uncontrolled outflow of the oil fed through the feed bores 16 out of the bearing is prevented.

LIST OF REFERENCE NUMBERS

1 Input rotor of a converter
2 Shaft of the converter
3 Pump wheel of the oil pump
4 Housing of the oil pump
5 Rolling bearing
6 Bearing needle
7 Slit
8 Cage
9 Raceway
10 Raceway
11 First ring element or bushing
12 Second ring element
13 Raceway convexity
14 Gap
15 Flange
16 Feed bore
17 Sealing ring

What is claimed is:

1. A rolling bearing (5) having at least one race ring which is configured as a composite hollow ring comprising a first ring element (11) in contact with rolling elements (6) and a second ring element (12) surrounding the first ring element (11), a gap (14) filled with fluid being arranged between both ring elements (11, 12), characterized in that the first ring element (11) is configured as a thin-walled bushing of uniform wall thickness whose raceway (10) comprises, in at least one peripheral section, an elastically yielding raceway convexity (13) deviating from its circular shape so that at least one of the rolling elements (6) is radially pre-stressed between the raceway convexity (13) and a raceway (9) situated opposite thereto, a sealing ring (17) being arranged between a flange (15) of the second ring element (12) and the rolling element crown ring (6).

2. A rolling bearing (5) according to claim 1, characterized in that the raceway (10) of the bushing comprises a raceway convexity (13) in three peripheral sections offset at 120° to one another.

3. A rolling bearing (5) according to claim 1, characterized in that a flange (15) of the second ring element (12) comprises circumferentially uniformly spaced axial feed bores (16).

4. A rolling bearing (5) according to claim 1, characterized in that it is used for the clearance-free mounting of a converter neck (2) of a hydrodynamic torque converter.

* * * * *